(12) United States Patent
Morello et al.

(10) Patent No.: US 6,284,299 B1
(45) Date of Patent: Sep. 4, 2001

(54) METHOD FOR PROCESSING OAT GROATS TO ENHANCE DESIRED MAILLARD PRODUCTS TO PROMOTE DESIRED TOAST FLAVOR IN THE GROATS AND PRODUCTS MADE BY THE METHODS

(75) Inventors: Michael J. Morello, Cary; James D. Hansa, Algonquin; Alice H. Hibbs, Crystal Lake, all of IL (US)

(73) Assignee: The Quaker Oats Company, Chicago, IL (US)

( * ) Notice: Subject to any disclaimer, the term of this patent is extended or adjusted under 35 U.S.C. 154(b) by 0 days.

(21) Appl. No.: 09/644,981

(22) Filed: May 12, 2000

Related U.S. Application Data

(60) Provisional application No. 60/135,121, filed on May 19, 1999.

(51) Int. Cl.[7] .............................. A23L 1/025; A23L 1/03
(52) U.S. Cl. .................... 426/455; 426/426; 426/456; 426/463; 426/466; 426/467; 426/618; 426/619
(58) Field of Search ................................. 426/455, 456, 426/463, 466, 467, 618, 619

(56) References Cited

U.S. PATENT DOCUMENTS 184,837 * 1/1876 Chichester ........................ 426/463
5,997,917 * 12/1999 Uchida et al. ..................... 426/465

* cited by examiner

*Primary Examiner*—Helen Pratt
(74) *Attorney, Agent, or Firm*—Wallenstein & Wagner, LTD

(57) ABSTRACT

Processes directed to increasing the solution mobility, solution concentration, and/or solution kinetics with respect to at least simple sugars within the groat to increase the availability of the simple sugars to react with nitrogen containing compounds, in particular amino acids. Improved control over the thermal stability of each groat is provided by enhancing the removal of thermal energy from the individual groats during Maillard reactions. Preferred processes include increasing the moisture content of groats to a level sufficient to solubilize upon dry heating and evaporating at least a sufficient amount of simple sugars present in the groat to yield after dry heating and evaporating an MRP $\geq$ about 34 ppb and an (MRP/LOP)×1000 value $\geq$6.0. Groats are dried with a forced atmosphere having a temperature of about $\geq$200° F. Full reaction and drying can be accomplished in as little as 8–30 minutes. Rates of thermally controlled reaction and drying may includes about 0.5–3% by weight moisture loss per minute. Oat groats with improved toast flavor are made according to these processes, including oat groats having an MRP value within a range of about 100–2300 ppb and an (MRP/LOP)×100 having a corresponding range of about 11–500.

31 Claims, 2 Drawing Sheets

METHOD FOR PROCESSING OAT GROATS TO ENHANCE DESIRED MAILLARD PRODUCTS TO PROMOTE DESIRED TOAST FLAVOR IN THE GROATS AND PRODUCTS MADE BY THE METHODS

RELATED APPLICATIONS

This application claims priority from U.S. Ser. No. 60/135,121 filed May 19, 1999.

TECHNICAL FIELD

This invention relates to the processing of oat grain for conversion to a food product or to an intermediate product for further processing into a food product, in particular it is directed to improved methods and apparatus to provide a toast flavor in oat groats through enhancement of Maillard reactions in the groats while incurring a minimum of lipid oxidation.

BACKGROUND OF THE INVENTION

The Maillard reaction takes place when food components like reducing sugars and amino acids react together. This reaction occurs in most foods on heating. Maillard reaction chemistry can affect desirable flavors and color of a wide range of foods and beverages including malts and beers, bread, snacks. coffee, heated fruit and vegetable products, breakfast cereals, and meat.

One problem with efforts to enhance toast flavor in oat groats or their derivatives such as cut groats, bumped groats, flour, dough, flakes, etc., via Maillard reactions is the coincidental oxidation of lipids naturally contained in significant quantities in oat grain. The oxidized lipids can cause undesired off-flavor and rancidity.

Lipid oxidation can be initiated by the same thermal energy employed to activate and drive Maillard reactions to produce reaction products imparting favorable flavors. Once initiated, the lipid oxidation becomes auto catalytic and cannot be controlled easily, if at all. Complicating matters oat groats contain natural enzymes which must be deactivated to stabilize the groat (or its derivatives) composition from degradation by the enzymes.

Conventionally, groats are tempered with steam two deactivate the enzymes, at least in part. A typical steam tempering process ranges from 12 to 15 minutes where the temperature of the groat reaches 210–220° F. The tempered groats are then processed through a kiln where they are subjected to more heat, typically ranging up to 240° F. During this kilning process the groats remain in a relatively high humidity (steam) atmosphere.

This process is generally successful at deactivating enzymes, avoiding rancidity, and producing a "cooked" flavor. However, the process is time and energy intensive and produces only a minimal toast flavor. Conventional kiln equipment also takes up substantial space and poses a relatively large capital expenditure.

Also an imposing problem, is the obstructive morphology of the oat grain (or groat) itself. It appears that it is not well understood how to optimize Maillard reaction chemistry within the oat groat cellular structure itself, that is, in situ.

Accordingly, in an attempt to provide a successful enhancement of toast flavor to a final oat food product, others have conventionally shifted their focus from the difficult problem posed by the groat's natural morphology to its more accessible derivative forms, down-stream of the groat pre-processing . For example, U.S. Pat. No. 4,963,373 issued to Fan et.al discloses a toasting step involving oat flour dough, after a flaking process for a ready to cat ("RTE") cereal product. With respect to lipid oxidation during attempts to enhance toast flavor, even these other methods rely on the addition of antioxidants such as BHA and BHT, before or after toasting to retard oxidation of the lipids.

None of these approaches provide a solution for dealing with enhancement of toast flavor in the gross cellular structure of either whole groats or split, cut, cracked, bumped, or flattened groats. Such forms of the oat groat are desired in consumer cooking as main the main constituent to make for example, an oatmeal porridge or an oatmeal cookie. They are also used in popular pre-prepared consumer products such as cereal bars, snack bars, textural coatings, etc., where the oats either provide an adjunct enhancement to flavor and texture of the product or serve as a main constituent of the product, such as However, recently others have attempted improvements in adding toast flavor during the initial processing (or pre-processing) of oat groats. In particular, U.S. Pat. No. 5,523,109, issued to Hellweg et.al. discloses a method where "whole oat groats are steamed for greater times, dry toasted for extended times" in an attempt to provide a toasted oat flour after milling of the groat. Hellweg el. al. states that "minimal peroxidase activity and a ratio of the HPLC syringic acid peak to ferulic acid peak, of about ≧2.5 which ratio is characteristic of a toasted flavor attribute." However, neither Syringic/Furulic acids, nor phenolic acids in general, are believed by the present inventors to accurately reflect the formation of desired Maillard reaction products. Hence, the degree of success of this process is in doubt, or at least not demonstrated. Further, the Heliweg et. al. process suffers two further drawbacks.

First, it employs steps which are energy and time intensive, in particular. "steaming for greater times" and dry toasted for "extended times." Kilning is also included between the steaming and dry roasting step. This is not only a disadvantage in cost and manufacturing efficiency, it also exposes the groat to extensive thermal energy, risking the initiation of autocatalytic oxidation of the lipids.

Second, the Hellweg et. al. process has as a (coal, to partially gelatinize or precook the groat. (See Hellweg et. al. reference to Faringraph measurements). This precooking and or partial gelatinization is not necessarily desirable when the groat is to be used in its integral or near-integral form, for example: as a cut groat, or rolled oat for consumer cooking into a porridge, or as either a whole groat or rolled groat as might be used in a granola or snack/cereal bar as an enhancing texturizer or as a main constituent.

In addressing these problems, the present inventors examined the unique attributes and constraints associated with whole oat groats and the Maillard reactions thought to be of interest for providing a toast flavor. Most notable is the constraint on reaction kinetics presented by the three dimensional morphology presented by the biological and cellular make up of a groat.

Also considered were the Maillard reactions themselves in terms of optimizing production of favorable products by providing conditions favorable to desired reaction paths occurring in the three basic phases of the Maillard reactions. In particular, the initial reactions ("Phase I Maillard reactions") are condensations of amino acids with simple sugars, which each lose a molecule of water to form N-substituted aldosylamines. These are unstable and undergo Amadori rearrangement to form 1-amino-1-deoxy-2-ketoses, also known as "ketosamines."

These ketosamines can then undergo complex subsequent reaction paths toward Phase III products, generally characterized as either: (1) dehydration; (2) fission; or, (3) polymerization, reactions ("Phase II Maillard reactions").

The first Phase II path is simply for the ketosamines to further dehydrate (i.e. loss of two water molecules) into reductones & dehydro reductones. Reductones and dehydro reductones, in their reduced state, are powerful antioxidants.

The second Phase II path produces short chain hydrolyctic fission products, such as, diacetyl acetol, pyruvaldehyde etc.

In a third path from Phase II products to Phase III products. polymerization occurs to yield furfural and melanoids.

It is a goal of the present invention to at least enhance the second path of Phase II, so as to ultimately produce favorable nitrogen heterocycles in particular, pyrazines and thiazoles (Phase III Maillard products).

Due to the morphology of the oat grain (or groat) it was proposed that the simple sugars, were constrained to an appreciable degree from physical molecular movement in within the groat; hence, were limited in their opportunity to come into contact with amino acids for reaction. To address this, it was proposed to increase the mobility of these simple sugars (i.e. mono, di, tri, and tetra, saccharides) by solubilizing them within the groat. Solubilization, it was believed, might be accomplished in significant degree by adding sufficient moisture to the groat. The amount of moisture necessary for this solubilization was then examined experimentally, as discussed below, although it was initially believed that between 1.5 to 2.0 times the normal amount of moisture contained in the groat may suffice, i.e. 21–30%.

It was also proposed that because dehydration reactions are a desired Phase II path, after mobilization of the simple sugars and/or amino acids, physical dehydration of this added moisture may help drive Phase II reaction equilibrium.

SUMMARY OF THE INVENTION

Based upon experimental data, it is believed that unique process parameters have been determined resulting in improved processes for treating oat groats, cut groats, split groats, rolled groats, bumped groats or the like ("groat").

According to a first aspect of the invention, processes are directed to increasing the solution mobility, solution concentration, and/or solution kinetics with respect to at least simple sugars (ideally- mono, di, tri and tetra, saccharides) and amino acids within the groat. These all essentially will increase the availability of at least the simple sugars to react with nitrogen containing compounds, in particular amino acids. While it is a goal to increase the availability of at least the lower molecular weight sugars, it is also contemplated that higher molecular weight sugars such as tetrasaccharides may be made advantageously more available for reaction according to the invention.

A preferred method of increasing the availability is to increase the moisture content of the groat above its native or initial amount of water to a level sufficient to solubilize at least a sufficient amount of at least simple sugars present in the groat to yield a total concentration of selected Maillard reaction products ("MRP")≧about 34 ppb, after drying. Preferably, the moisture content is increased to above about 14%, but more preferably above 18–20% by weight.

Another proposed method for increasing the availability via increasing solution kinetics is to direct microwave energy into a moist groat. Advantageously, this method can also be enhanced by increasing the moisture content of the groats as noted above. Synergistically, heat generated by the microwaves can supply necessary activation energy for the desired Maillard reactions.

According to a separate aspect of the invention, a unique method of controlling the thermal history of a groat, at least during Maillard reaction, was found to be beneficial. It was noted that during, conventional processes, in particular kilning, the ambient environment surrounding each groat includes high heat and humidity (e.g. steam vapor). It was also noted that Maillard reactions are exothermic and thus must generate heat within the groat. It was proposed that due both to this conventional kilning environment and the groat's cellular morphology heat transfer from the groat may be excessively restricted. This may provide for inadequate control of the reaction process temperatures occurring in situ. In other words, groats in such a conventional environment are intended to equilibrated to the imposed environmental temperature. However, it would appear that it has hereto fore not been taken into account that a groat brought up to the imposed environmental temperature will generate internal thermal energy which if not dissipated will cause an internal groat temperature higher than the thermally buffered environment. In such a case, the internal temperature of an individual groat may become excessive with respect to avoidance of lipid oxidation and with respect to formation of desirable Maillard products.

Accordingly, other methods according to the invention include providing more control over the thermal stability of each groat. In general the invention contemplates enhancing the removal of thermal energy from the individual groats to better correlate the internal temperature of the groat with its controlled external environment. One way to accomplish this is to provide an atmosphere, such as air, about the groats with sufficiently low relative humidify to encourage evaporation of water from the groat thereby removing heat (of vaporization) from the groat during Maillard reactions. Moving this air, such as by a fan, may provide added control of thermal energy in the groat as the rate of evaporation can be better controlled.

A synergistic advantage of such thermal control is that the groats can be dried relatively rapidly compared to conventional processes, while still yielding as much or more desirable Maillard products in the groats. By providing heat to the air, especially the moving air, even more refined control can achieved. By varying the temperature, mass flow, and relative humidity of the drying atmosphere, a large degree of control is available. The heated air not only aids in evaporation, it can also provide the necessary activation energy needed while synergistically directing the groat toward a more isothermal internal temperature.

It should be understood that providing thermal energy sufficient to drive Maillard reactions and/or assist in evaporation may be supplied by other conventional means than heated air, such as infrared lamps. The importance of such thermal input being of primary significance, as opposed to its source.

Hence, preferred methods according to the invention may include increasing the moisture content of the groats and drying of the groats to an acceptable water content for storage in about 8–30 minutes. From an another approach, the reaction of simple sugars and dehydration or drying of the groat can be accomplished preferably at a rate of about 0.5–3% by weight moisture per minute.

In combination, according to another process of the invention includes increasing the moisture content of the groats to ≧20% by weight and drying the groats with an atmosphere having a temperature of about ≧200° F. Also, the moisture content of the groats can be increased to ≧15% and then successfully dried in about ≦60 minutes, preferably in the range of about 8–60 minutes. Another aspect of the invention is to increase the moisture content of the groats to >20% and then drying the groats while drying for about 8–30 minutes. According to another aspect of the invention, the moisture content of the groats is increased to >14% by weight and then heated to reduce the moisture content at a rate of about 0.5–3% by weight moisture per minute.

According to preferred methods, it was found that oat groats with improved toast flavor having an MRP ≧ about 34 ppb and a ratio of MRP to a concentration of ceratin lipid oxidation products ("LOP") which is ≧6.0./100 (in other words, (MRP/LOP)×100=6.0)) can be produced. Preferably, oat groats can be made according to the methods of the invention having an MRP value within a range of about 100 to 2300 ppb and a corresponding ((MRP/LOP)×100) value in the range of about 7–500 ppb.

It should also be understood, that once the groats have developed the desired Maillard products, the flavors and or aromas imparted thereby should be present in post-processed (e.g. grinding, milling, etc.) or derivative forms (e.g. flour) of the groats.

DETAILED DESCRIPTION

Figure 1:
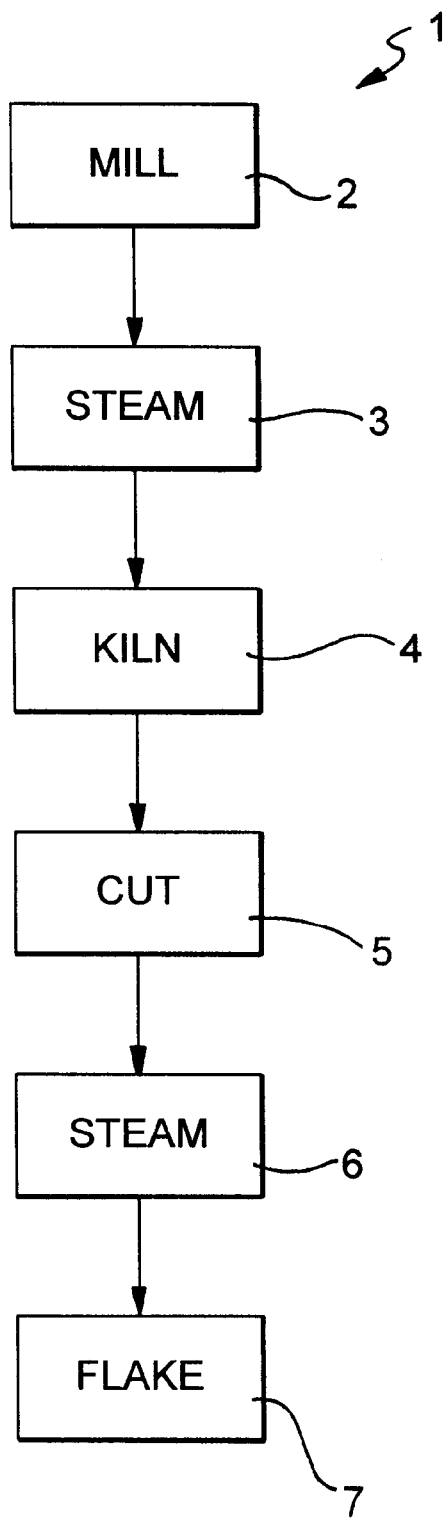
FIG. 1 is a block diagram showing an exemplary conventional process treating oat groats before post-processing; and, FIG. 2 is a block diagram showing other exemplary and optional processes according to the invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

PROCESSES GENERALLY

FIG. 1 discloses a conventional process 1 for preparing oat grain ultimately into flakes which can be used for cereals, snack foods and the like. The milling step 2 is where the oat kernels are dehulled to expose the oat groats. The groats are steamed (Ref. No. 3) and kilned (Ref. No. 4) generally in accordance with the parameters shown in Example 1 below as is conventional. The groats, after kilning and cooling, may be cut or split (Ref. No. 5), then steamed (Ref. No. 6) in preparation for flaking (Ref. No. 7).

Figure 2:
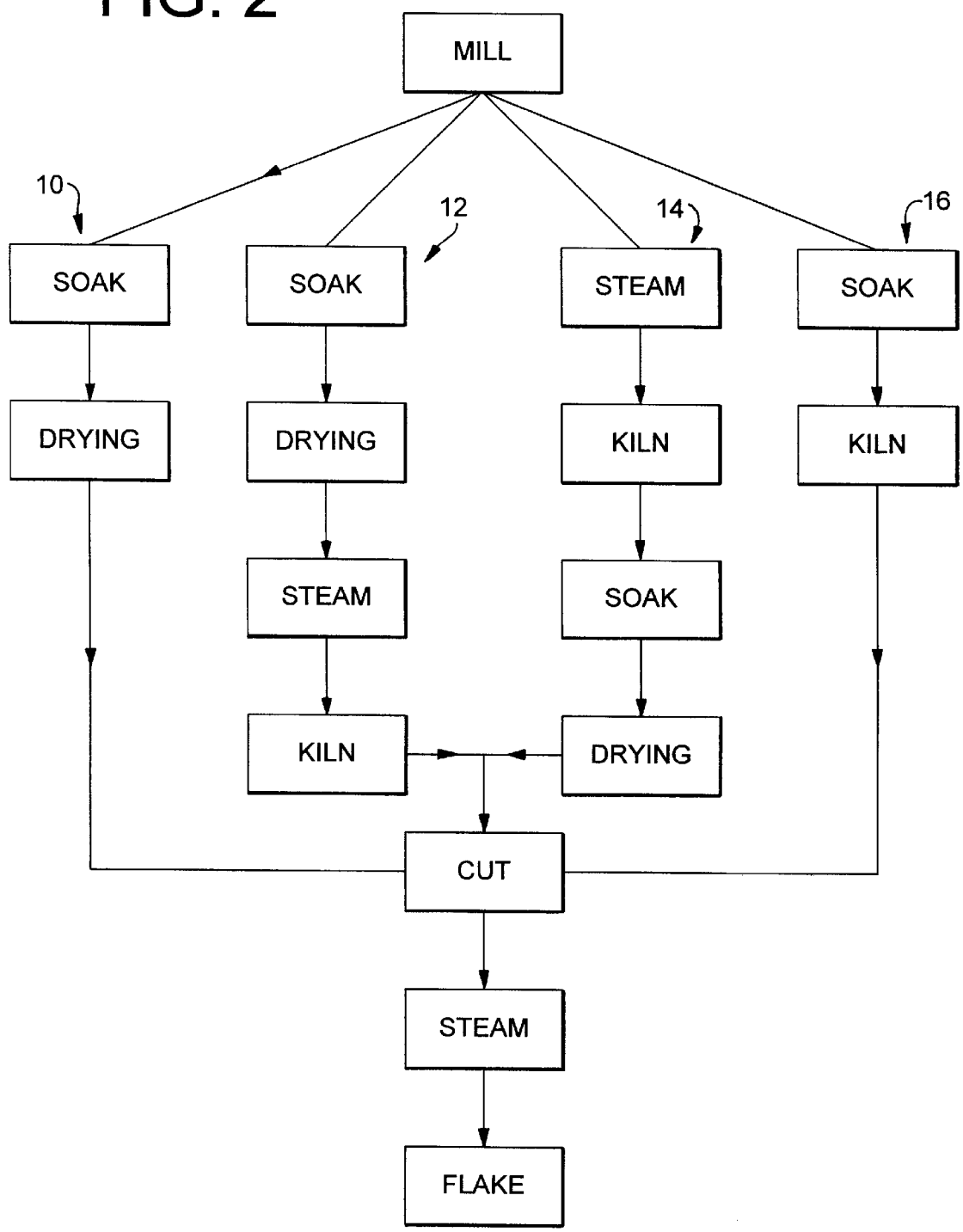

FIG. 2 discloses various methods 10, 12, 14 and 16 for processing oat groats according to the invention. Data relating to these various processes is disclosed respectively in Examples 2–8 below as follows:

Process 10→Example 2;
Process 12→Examples 5, 6, 7 and 8;
Process 14→Example 4;
Process 16→Example 3.

Each of the processes 10–16 starts with an oat kernel milled to a groat. In each case, the groats have an initial water content ranging from about 10% to about 12%. Upon looking at the data of the Examples 1–8, it should be understood that according to one aspect of the invention, each of the processes is capable of being performed to include, at various points in the total process, increasing the moisture content of the groats to a level sufficient to solubilize at least a sufficient amount of simple sugars present in the groat to yield, after heating and evaporating, an MRP ≧ about 34 ppb and an (MRP/LOP)×100 value ≧6.0. In all Examples 1, 3, 4, and 6–8, the groats are dried to a level suitable for further storage or handling. In Examples 2 and 5, some moisture was added back to the groats before steaming and flaking per the process identified in U.S. Pat. No. 4,957,762.

In all Examples the soaking was carried out by immersion and stirring of the groats in water at room temperature. The groats were then drained and placed upon perforated drying trays in preparation for the drying steps.

It was noted that the processes disclosed in the Examples below enhanced product of substantially all Maillard products. However, only the following compounds were measured (via chromatography) to define the amount of Maillard reaction products ("MRP") as used herein: methyl pyrazines, 2, 5/6 dimethylpyrazine; 2,3 dimethylpyrazine; ethyl pyrazine; trimethylpyrazine; 2-ethyl-5/6-methylpyrazine; 2-ethyl-3 -methylpyrazine; n-propylpyrazine; and iso-propylpyrazine. These amount or yield of these compounds are believed to be indicative of the amount or yield of most of the Maillard products. These compounds were chosen for ease of analysis and because they are also indicative of the class of compounds responsible for desired toast flavor. As seen in the Examples below, lipid oxidation as a function or ratio to MRPs formed is lower for the processes according to the invention (Examples 2–8) than for the control, Example 1. The value "LOP" or lipid oxidation product is the measure of only the following compounds thought to be indicative of the lipid oxidation as a whole: hexanal; nonanal; and trans, trans-2, 4-decadienal.

By providing the ratio of MRP/LOP it is believed one of ordinary skill in the art will better understand the relative advancement of the desired MRP versus LOP in comparing the various Examples. It is also believed that the higher the ratio value, the less likely the lipid oxidation products will offset the toast flavor provided by the desired Maillard products.

According to another aspect of the invention, the moisture content of the groats is increased to >20% by weight to increase solubilization. The groats where applicable were then dried with a heated forced atmosphere oven available from Aeroglide Company. For all Examples involving forced heated air, the weight of the groat batch was approximately 45–60 pounds. The atmosphere used was air, blown at the groats from various directions during a drying cycle at approximately 670 SCFM. The temperatures are indicated in the Examples.

According to another process of the invention, appreciable from the Examples, the moisture content of the groats is increased to >15% by weight and then dried while evaporating water contained in the groat for ≦60 minutes. Likewise, increasing the moisture content of the groats to >20% by weight and drying the groats while evaporating water contained in the groat for in a range of about 8–30 minutes is disclosed.

Another aspect of the invention includes increasing the moisture content of the groats to >14% by weight and heating the groats and reducing the water content by a rate of about 0.5–3% by weight moisture per minute. It is believed that this rapid evaporation rate may cause an advantageous thermal history as relates to the oxidation of lipids. For example, the rapid vaporization would cause an increase in the amount of thermal energy to be utilized to vaporize the moisture assisting in prevention of lipid oxidation initiation and reducing water at a favorable rate to drive equilibrium of the hydrolyctic fission reactions.

EXAMPLE 1

| STEAM → KILN → COOL → CUTTING & FLAKING (Control) | |
|---|---|
| groat moisture after milling | = 11.38% |
| groat moisture after steam | = 13.5% |
| steam time | = 10 min. |
| kiln time | = 60 min. |
| product temp after kiln | = 212° F. |
| moisture after kiln | = 8.39% |
| moisture after cooling from kiln | = 8.73% |
| flake moisture after cooling | = 11.42% |
| total MRP | = 42.59 ppb |
| total LOP | = 690.85 ppb |
| ration (MRP/LOP) × 100 | = 6.16 |

EXAMPLE 2

| SOAK → DRY HEAT → COOL → CUTTING & FLAKING | |
|---|---|
| groat moisture after milling | = 10.6% |
| time of soak @ 85° F. | = 120 min. |
| moisture after soak | = 23.8% |
| temp of air in dry heat | = 350° F. |
| time of dry heat | = 16 min. |
| moisture after cooling from dry heat | = 7.3% |
| moisture after flaking | = 10.5% |
| total MRP | = 659.8 ppb |
| total LOP | = 1348.8 ppb |
| ratio (MRP/LOP) × 100 | = 48.9 |

EXAMPLE 3

| SOAK → KILN → COOL → CUTTING & FLAKING | |
|---|---|
| groat moisture after milling | = 11.55% |
| time of soak @ 85° F. | = 180 min. |
| moisture after soak | = 24.8% |
| kiln time | = 90 min. |
| product temp after kiln | = 207° F. |
| moisture after kiln | = 13.7% |
| moisture after cooling | = 12.6% |
| total MRP | = 55.93 ppb |
| total LOP | = 659.74 ppb |
| ratio (MRP/LOP) × 100 | = 8.48 |

EXAMPLE 4

| STEAM → KILN → COOL → SOAK → DRY HEAT → COOL → CUTTING & FLAKING | |
|---|---|
| groat moisture after milling | = 10.21% |
| steam time | = 15 min. |
| groat moisture after steam | = 11.88% |
| kiln time | = 60 min. |
| product temp after kiln | = 217° F. |
| moisture after kiln | = 6.91% |
| time of soak at 85° F. | = 120 min. |
| moisture after soak | = 23.6% |
| temp of air in dry heat | = 200° F. |
| time of dry heat | = 48 min. |
| moisture after cooling from dry heat | = 7.2% |
| moisture after flaking | = 9.74% |
| total MRP | = 55.89 ppb |
| total LOP | = 595.1 ppb |
| ratio (MRP/LOP) × 100 | = 9.39 |

| SOAK → DRY HEAT (200) → KILN → COOL → CUTTING & FLAKING | |
|---|---|
| groat moisture after milling | = 10.79% |
| time of soak @ 85° F. | = 30 min. |
| moisture after soak | = 21.04% |
| temp of air in dry heat | = 200 |
| time of dry heat | = 24 min. |
| moisture of groats after cooling from dry heat | = 9.08% |
| kiln time | = 60 min. |
| product temp after kiln | = 227° F. |
| moisture after kiln | = 4.94% |
| moisture after cooling from kiln | = 6.10% |
| moisture after flaking | = 8.42% |
| total MRP | = 133.33 ppb |
| total LOP | = 742.61 ppb |
| ratio (MRP/LOP) × 100 | = 17.95 |

| SOAK → DRY HEAT (350) → KILN → COOL → CUTTING & FLAKING | |
|---|---|
| groat moisture after milling | = 11.11% |
| time of soak @ 85° F. | = 120 min. |
| moisture after soak | = 28.6% |
| temp of air in dry heat | = 350° F. |
| time of dry heat | = 16 min. |
| moisture of groats after cooling from dry heat | = 12.42% |
| kiln time | = 60 min. |
| product temp after kiln | = 220° F. |
| moisture after kiln | = 6.00% |
| moisture after cooling from kiln | = 6.36% |
| moisture after flaking | = 11.18% |
| total MRP | = 348.91 ppb |
| total LOP | = 963.89 ppb |
| ratio (MRP/LOP) × 100 | = 36.20 |

| SOAK → DRY HEAT (400) → KILN → COOL → CUTTING & FLAKING | |
|---|---|
| groat moisture after milling | = 10.76% |
| time of soak @ 85° F. | = 120 min. |
| moisture after soak | = 27.9% |
| temp of air in dry heat | = 400° F. |
| time of dry heat | = 14 min. |
| moisture of groats after cooling from dry heat | = 11.10% |

-continued

| SOAK → DRY HEAT (400) → KILN → COOL → CUTTING & FLAKING | |
|---|---|
| kiln time | = 60 min. |
| product temp after kiln | = 227° F. |
| moisture after kiln | = 5.32% |
| moisture after cooling from kiln | = 6.02% |
| moisture after flaking | = 9.4% |
| total MRP | = 710.80 ppb |
| total LOP | = 578.22 ppb |
| ratio (MRP/LOP) × 100 | = 122.93 |

| SOAK → DRY HEAT (450) → KILN → COOL → CUTTING & FLAKING | |
|---|---|
| groat moisture after milling | = 10.14% |
| time of soak @ 85° F. | = 120 min. |
| moisture after soak | = 28.9% |
| temp of air in dry heat | = 450° F. |
| time of dry heat | = 12 min. |
| moisture of groats after cooling from dry heat | = 9.62% |
| kiln time | = 60 min. |
| product temp affer kiln | = 233° F. |
| moisture after kiln | = 4.44% |
| moisture after cooling from kiln | = 5.38% |
| moisture after flaking | = 10.19% |
| total MRP | = 2283.54 ppb |
| total LOP | = 494.69 ppb |
| ratio (MRP/LOP) × 100 | = 461.60 |

As should be apparent from the Examples, processes according to the invention can be easily integrated into conventional process schemes and provide advantages over the prior art. The processes according to the invention may also be employed independently as shown in Example 2 with improved results.

Significant cost saving appear to be available for implementation of processes such as disclosed in Example 2 as expensive kilns can be omitted. Kilns are more expensive in cost and in the energy of operation and maintenance. Also, the data shows that a great deal of processing time and energy will be saved, with less resulting spoilage, in practicing processes under the invention.

It will also be understood by those in the art that the cutting, steaming and flaking steps shown in FIG. 2 are merely exemplary post-processing steps and could be omitted, rearranged or substituted with other conventional port-processing steps without affect to the principles of the invention.

While the specific embodiments have been illustrated and described, numerous modifications come to mind without significantly departing from the spirit of the invention and the scope of protection is only limited by the scope of the accompanying claims.

For example, it is contemplated that processes according to the invention can be further enhanced by the addition of simple sugars, e.g. pentose, or pH modifiers to the groat during a soaking or tempering step, prior to heating and evaporating. This would be an impregnation process such as those well known in the art. For example, non-native components or reactants such as: individual amino acids, their degradation products; other alternate sources of nitrogen and sulfur; simple sugars and their degradation products, together with appropriate buffer systems to control pH, can, each or in any combinations thereof, modify or enhance products of the Maillard Reaction. For example see: *Thermally Generated Flavors: Maillard, Microwave and Extrusion Processes*; T. H. Parliament, M. J. Morello, and R. J. McGorrin Eds.; ACS Symposium Series 543; American Chemical Society; Washington, D.C.; 1994 and Amino-Carbonyl Reactions in Food and Biological Systems; M. Fujimaki, M. Namiki & H. Kato, Eds.; Developments in Food science 13; Elsevier; 1986.

It is proposed that these additive ingredients should also modify or enhance Maillard Reactions within oat groats, if they are allowed to come into contact and react with inherent-like substances. A barrier to additive ingredients contacting substances within the oat groat is the seed coat or pericarp. To overcome this barrier, and thereby promote infusion of additive ingredients, the seed coat must be disrupted. Possible ways to accomplish this are to use steel cut oats, often referred to as "Irish Oatmeal," or bumping whole oat groats. Where bumping is the process of passing whole groats through flaking rolls set at just under the girth of the groat.

Hence the present invention should provide added advantages and enhance production and control of desired Maillard reaction products by incorporation with the addition of sugars, pH modifiers, and other constituents pre-impregnated into groats which undergoes a process according to the invention.

What is claimed is:

1. A method for processing oat groats having an initial water content comprising:
   immersing the groats in a liquid phase water bath maintained at a temperature below the gelatinization temperature of the oat groats; and,
   increasing the moisture content of the groats to a level sufficient to solubilize at least a sufficient amount of simple sugars present in the groat to yield, after Maillard reaction and drying to a desired storage moisture content, an MRP ≧ about 34 ppb and an (MRP/LOP)× 100 value ≧6.0.

2. The method of claim 1 wherein the increasing water step further includes agitating the oat groats immersed in the water.

3. The method of claim 1 wherein the temperature of the water bath is in the range of about 60° F. to about 145° F.

4. The method of claim 1 wherein the groat has an initial water content of about 9% to about 13%, and the increasing step brings the total water content to within a range of about 30% to about 40%.

5. The method of claim 1 wherein the groat has an initial water content of about 7% to about 15% and the increasing the moisture step includes adding pressure and brings the total water content to within a range of about 18% to about 40%.

6. The method of claim 1 wherein the groats are initially impregnated with one or more of non-native reactants for Maillard reaction and a pH modifier.

7. A method for processing oat groats wherein the groat has an initial water content of about 7% to about 15% comprising:
   soaking the groats at a temperature below their gelatinization temperature; and,
   increasing the moisture content of the groats to a level sufficient to solubilize at least a sufficient amount of simple sugars present in the groat to yield, after Maillard reaction and drying to a desired storage moisture content, an MRP ≧ about 34 ppb and an (MRP/LOP)× 100 value ≧6.0 and to bring the total water content to within a range of about 18% to about 40%.

8. The method of claim 7 wherein the groat has an initial water content of about 9% to about 13% and the increasing step brings the total water content to within a range of about 30% to about 40%.

9. The method of claim 7 including the step of drying the groats by providing a heated atmosphere for contact with the groats and moving the atmosphere about the groat in a manner to assist in evaporation.

10. The method of claim 9 wherein the atmosphere is a non-oxidizing atmosphere.

11. The method of claim 9 wherein the temperature range of the atmosphere is in the range of about 100° F. to about 450° F.

12. The method of claim 9 wherein the atmosphere is air.

13. A method of processing oat groats wherein the groat has an initial water content of about 9% to about 13% comprising:
soaking the groats at a temperature below their gelatinization temperature; and,
increasing the moisture content of the groats to a level sufficient to solubilize at least a sufficient amount of simple sugars present in the groat to yield, after Maillard reaction and drying to a desired storage moisture content, an MRP ≧ about 34 ppb and an (MRP/LOP)× 100 value ≧6.0 and to bring the total water content to within a range of about 30% to about 40%.

14. A method of processing oat groats comprising:
exposing the groats to vapor phase water at a temperature below their gelatinization temperature; and,
increasing the moisture content of the groats to a level sufficient to solubilize at least a sufficient amount of simple sugars present in the groat to yield, after Maillard reaction and drying to a desired storage moisture content, an MRP ≧ about 34 ppb and an (MRP/LOP)× 100 value ≧6.0.

15. A method of processing oat groats comprising:
soaking the groats at a temperature below their gelatinization temperature; and,
increasing the moisture content of the groats to a level sufficient to solubilize at least a sufficient amount of simple sugars present in the groat to yield, after Maillard reaction and drying to a desired storage moisture content, an MRP is within a range of about 100–2300 ppb and the (MRP/LOP)×100 is in a corresponding range of about 11–500.

16. An oat groat having an MRP ≧ about 34 ppb and an (MRP/LOP)×100 value ≧6.0 and the groat being sufficiently non-gelatinized that it is suitable for further conventional groat processing.

17. An oat groat having an MRP value within a range of about 100–2300 ppb and an (MRP/LOP)×100 having a corresponding range of about 11–500 and the groat being sufficiently non-gelatinized that it is suitable for further conventional groat processing.

18. A method for processing oat groats having an initial water content comprising:
soaking the groats at a temperature below their gelatinization temperature;
increasing the moisture content of the groats to a level sufficient to solubilize at last a sufficient amount of simple sugars present in the groat to yield, after Maillard reaction and drying to a desired storage moisture content, an MRP ≧ about 34 ppb and an (MRP/LOP)× 100 value ≧6.0; and,
providing thermal energy to the groats in an amount sufficient to activate Maillard reactions by providing a thermal environment about the groats; and,
controlling the temperature within the groat during the Maillard reactions by removing thermal energy from the groats at a rate so as not to exceed a desired temperature, the desired temperature being about equal to or less than the temperature of the thermal environment provided.

19. The method of claim 18 wherein the controlling the temperature step includes providing an atmosphere about the groats having a sufficiently low relative humidity to encourage evaporation of water from the groat thereby removing heat from the groat.

20. The method of claim 18 wherein the removing thermal energy step includes providing an atmosphere about the groats sufficiently low in relative humidity to encourage evaporation of water from the groat thereby removing thermal energy from the groat.

21. The method of claim 18 wherein the providing thermal energy step includes directing a heated atmosphere across the groats.

22. The method of claim 21 wherein the atmosphere is in continuous motion across the groats thereby enhancing evaporation and thereby removal of thermal energy from the groats.

23. The method of claim 18 including the step of increasing availability for reaction of at least simple sugars within the groat by increasing the moisture content of the groats to >14% by weight and wherein the increasing the availability includes increasing the solution kinetics within the groat by directing microwave energy to the internal structure of the groat.

24. A method for processing oat groats having an initial water content of about 7% to about 15%, comprising:
soaking the groats at a temperature below their gelatinization temperature and thereby increasing the moisture content of the groats to a total water content to within a range of about 15% to about 40%; and,
conducting Maillard reactions within the groat, and thereby producing an MRP ≧ about 34 ppb and an (MRP/LOP)×100 value ≧6.0.

25. The method of claim 24 further including the steps of controlling heat loss from the groats to an extent that the internal temperature of the groats does not exceed the temperature of an external thermal environment of the groats during the Maillard reactions.

26. The method of claim 24 including the step of increasing the solution kinetics within the groat by directing microwave energy to the internal structure of the groat.

27. The method of claim 6 wherein the non-native reactants are simple sugars.

28. The method of claim 27 wherein the non-native reactants are simple sugars.

29. A method for processing oat groats having an initial water content comprising:
providing thermal energy to the groats in an amount sufficient to activate Maillard reactions;
controlling the temperature within the groat during the Maillard reactions so as not to exceed a desired temperature;
increasing availability for reaction of at last simple sugars within the groat by increasing, the moisture content of the groats to ≧14% by weight, and the simple sugars present in the groat yielding, after Maillard reaction and drying to a desired storage moisture content, an MRP $\geq$ about 34 ppb and an (MRP/LOP)×100 value $\geq$6.0.; and, wherein the groats are initially impregnated with one or more of non-native reactants for Maillard reaction and a pH modifier.

30. A method for processing green oat groats having an initial water content of about 7% to about 15%, comprising:

soaking the groats at a temperature below their gelatinization temperature and thereby increasing the moisture content of the groats to a total water content to within a range of about 15% to about 40%, and the simple sugars present in the groat yielding, after Maillard reaction and drying to a desired storage moisture content, an MRP $\geq$ about 34 ppb and an (MRP/LOP)×100 value $\geq$6.0; and, the groats are initially impregnated with one or more of non-native reactants for Maillard reaction and a pH modifier.

31. The method of claim 28 wherein the nonnative reactants are simple sugars.

* * * * *